United States Patent
Bartolomé Rodrigo et al.

(10) Patent No.: US 11,669,256 B2
(45) Date of Patent: Jun. 6, 2023

(54) STORAGE RESOURCE CONTROLLER IN A 5G NETWORK SYSTEM

(71) Applicant: Telefonaktiebolaget LM Ericsson (publ), Stockholm (SE)

(72) Inventors: Maria Cruz Bartolomé Rodrigo, Madrid (ES); Antonio Alonso Alarcon, Leghorn (IT)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 52 days.

(21) Appl. No.: 17/274,130

(22) PCT Filed: Sep. 26, 2019

(86) PCT No.: PCT/IB2019/058201
§ 371 (c)(1),
(2) Date: Mar. 5, 2021

(87) PCT Pub. No.: WO2020/065593
PCT Pub. Date: Apr. 2, 2020

(65) Prior Publication Data
US 2021/0208806 A1     Jul. 8, 2021

(30) Foreign Application Priority Data
Sep. 27, 2018 (EP) .................................. 18382689

(51) Int. Cl.
*G06F 3/06* (2006.01)
(52) U.S. Cl.
CPC ............ *G06F 3/0635* (2013.01); *G06F 3/061* (2013.01); *G06F 3/067* (2013.01); *G06F 3/0631* (2013.01)

(58) Field of Classification Search
None
See application file for complete search history.

(56) References Cited

U.S. PATENT DOCUMENTS

| | | | |
|---|---|---|---|
| 5,668,943 A | 9/1997 | Attanasio et al. | |
| 10,499,357 B1 * | 12/2019 | Tiwari | H04W 12/08 |
| 2004/0139145 A1 | 7/2004 | Bar-Or et al. | |

OTHER PUBLICATIONS

3GPP, "3GPP TS 23.501 V15.2.0", Technical Specification, 3rd Generation Partnership Project; Technical Specification Group Services and System Aspects; System Architecture for the 5G System; Stage 2, (Release 15), Jun. 2018, 217 pages.

(Continued)

*Primary Examiner* — Brian R Peugh
(74) *Attorney, Agent, or Firm* — Nicholson De Vos Webster & Elliott LLP

(57) ABSTRACT

A method for managing storage resources in a network system is described. The method includes registering, by a storage resource controller, with a network repository function; receiving, by the storage resource controller, an operation request from a consumer service; selecting, by the storage resource controller, a resource management instance from a plurality of resource management instances managed by the storage resource controller for assignment to the consumer service; forwarding, by the storage resource controller, the operation request to the selected resource management instance; receiving, by the storage resource controller, an operation response from the selected resource management instance; and forwarding, by the storage resource controller, the operation response to the consumer service.

20 Claims, 7 Drawing Sheets

(56) References Cited

OTHER PUBLICATIONS

3GPP, "3GPP TS 23.502 V15.2.0", Technical Specification, 3rd Generation Partnership Project; Technical Specification Group Services and System Aspects; Procedures for the 5G System; Stage 2, (Release 15), Jun. 2018, 308 pages.
3GPP, "3GPP TR 23.742 V15.2.0", Technical Report, 3rd Generation Partnership Project; Technical Specification Group Services and System Aspects; Study on Enhancements to the Service-Based Architecture, (Release 16), Sep. 2018, 101 pages.
International Search Report and Written Opinion, PCT App. No. PCT/IB2019/058201, dated Jan. 9, 2020, 11 pages.
International Preliminary Report on Patentability, PCT App. No. PCT/IB2019/058201, dated Apr. 8, 2021, 8 pages.

* cited by examiner 4.2.5-1: A data storage architecture for unstructured data from any network function

STORAGE RESOURCE CONTROLLER IN A 5G NETWORK SYSTEM

CROSS-REFERENCE TO RELATED APPLICATIONS

This application is a National stage of International Application No. PCT/IB2019/058201, filed Sep. 26, 2019, which claims priority to EP Application No. 18382689.0, filed Sep. 27, 2018, which are hereby incorporated by reference.

TECHNICAL FIELD

Embodiments of the invention relate to the field of data storage for network functions (NF) in a fifth generation (5G) network system.

BACKGROUND ART

The 3rd Generation Partnership Project (3GPP) 5G System Release 15 (Rel-15) is documented in several technical specifications, including: (1) 3GPP Technical Specification (TS) 23.501 v15.2.0 "System Architecture for 5G System" and (2) 3GPP TS 23.502 v15.2.0 "Procedures for 5G System". Release 16 (Rel-16) is also being considered. The 3GPP 5G Core Network Control Plane (5GC), which is being defined in Rel-15, includes a disruptive change. In particular, traditional peer-to-peer interfaces and protocols (i.e., pre-5GC) are being replaced in Rel-15 by a Service Based Architecture (SBA), where each logical Network Function (NF) exposes one or multiple well-defined services (as a producer) to other NFs acting as consumer services using a Hypertext Transfer Protocol version 2.0 (HTTP/2)/Representational State Transfer (REST) Application Program Interfaces (APIs), which are known as Service Base Interfaces (SBIs).

A new NF, named Network Repository Function (NRF), has been defined to provide NF-service discovery capabilities in 5GCs, allowing NF-service producers to register their exposed NF-services (invoking the "NFRegister" operation offered through the "Nnrf_NFManagement" service by an NRF instance) for later NF-service consumers to discover them (e.g., through NRF exposed "Nnrf_NFDiscovery" service). A NF instance, acting as a service provider, provides/updates its NF profile at NF service registration time, including (among other information) all provided NF services and, for each NF service, the related end-point addresses.

Another relevant aspect defined in the 3GPP 5GC logical reference architecture is the expectation of cloud-native realizations for all NFs. Related to this aspect and focusing on the stateless realization principle, 3GPP has defined some data management related NFs in its 5GC logical reference architecture to support cloud-native realizations.

For example, the text below is an excerpt from 3GPP TS 23.501 v15.2.0 "System Architecture for 5G System" related to Unstructured Data Storage Function (UDSF) and Control Plane (CP) NFs. The UDSF is a function that supports the functionality of storage and retrieval of information as unstructured data by any NF. In the scope of 3GPP UDSF, "unstructured data" may be defined as "not standardized" or "non-standardized" data.

4.2.5 Data Storage architectures: As depicted in FIG. 1 (i.e., FIG. 4.2.5-1 of 3GPP TS 23.501 v15.2.0), the 5G system architecture allows any NF to store and retrieve its unstructured data into/from a UDSF (e.g. user entity contexts). The UDSF belongs to the same Public Land Mobile Network (PLMN) where the network function is located. CP NFs may share a UDSF for storing their respective unstructured data or may each have their own UDSF (e.g., a UDSF may be located close to the respective NF).

As outlined in the excerpt above, sharing a single UDSF instance across several NF instances or having a per-NF UDSF (sometimes referred to as NUDSF) instance is an implementation decision and 3GPP 5GC supports both models. However, for a NUDSF SBI, only a single service is defined and this definition is at a very high level (i.e., Nudsf UnstructuredDataManagement (Nudsf_UDM), which is documented in 3GPP TS 23.502 v15.2.0 "Procedures for 5G System" as shown in the below table:

TABLE 5.2

14-1: NF Services provided by UDSF

| NF service | Service Operations | Operation Semantics | Example Consumer(s) |
| --- | --- | --- | --- |
| Unstructured Data Management | Query | Request/Response | Any NF |
| | Create | Request/Response | Any NF |
| | Delete | Request/Response | Any NF |
| | Update | Request/Response | Any NF |

In the context of the 3GPP Technical Report (TR) 23.742 v1.0.0 "Study on Enhancements to the Service-Based Architecture" (sometimes referred to as eSBA), the new concept of a set of instances is under discussion. For example, as indicated in clause 6.11 of 3GPP TS 23.502 v15.2.0 "Procedures for 5G System", this solution proposes to define a services instance set concept that can support high reliability and also has potential to improve other aspects of the 5GC architecture.

The following are some of the key principles for service instance sets: (1) the service instance sets define a set of instances of the same service type and (2) all service instances in a set can access the same data storage (e.g., UDSF).

As shown in FIG. 2A (i.e., FIG. 6.11.2-1 of 3GPP TS 23.502 v15.2.0), a service instance set has a storage resource accessible by all service instances in the set. A service instance set may expose individual service instances to consumers, or it can use a load balancer. If a load balancer is used, the service instance set may appear as one service instance to consumers.

When a service instance set exposes multiple service instances to a consumer, the consumer is allowed to reselect a different service instance (within the same set) between transactions. As shown in FIG. 2B (i.e., FIG. 6.11.2-2 of 3GPP TS 23.502 v15.2.0) a service instance set may span multiple datacenters (DCs).

As shown in FIG. 2B and based on the excerpt above, in case a set spans more than one datacenter (e.g., DC1 and DC2), then one deployment option is that a local UDSF is defined within each DC. However, then both UDSFs need to be defined as holding the same data and configured to be able to replicate and keep in synchronization. Unfortunately, there are not any mechanisms defined for this purpose.

Further, as outlined in the eSBA technical report (i.e., 3GPP TR 23.742 v1.0.0 "Study on Enhancements to the Service-Based Architecture"), one of the requirements is to achieve an independent management per each service. However, sometimes this is not possible as long as some defined services in Rel-15 have some common data that is accessed internally by implementation dependent interfaces. One possible solution for that problem is to not consider those services as independent from a management perspective, but consider a group, which could be considered a deployment unit. This deployment unit will include two or more instances of different service types that then are deployed together and are a single vendor. Since the service instances within the deployment unit share some data, they need to access the same storage resource. How this is solved is not yet determined.

As described in 3GPP TS 23.501 v15.2.0 "System Architecture for 5G System", each NF may have its own UDSF instance, so multiple UDSF(s) are deployed. This multiplicity of UDSF(s) is expanded in eSBA to allow each set of same service instances to have its own storage resource. Nothing precludes defining multiple instance sets of the same service type. Therefore, there may be multiple UDSF(s), but for a consumer there is not a way to identify which is the right UDSF to contact since the registration is exactly the same for all (i.e., at registration in the NRF there is no way to distinguish one UDSF from another).

Accordingly, there are multiple issues to solve: 1) for Rel-15 definition, if different NFs have their own UDSF(s), each NF (acting as a Nudsf_UDM service consumer) needs to access the corresponding UDSF instance and not any other UDSF; (2) for Rel-16, in the context of the under discussion set concept, each instance within a set (acting as a Nudsf_UDM service consumer) needs to access the same instance of UDSF and not any other UDSF; (3) for Rel-16, dependent services that may be deployed in a single group (i.e., deployment unit) need to access the same storage resource(s); and (4) for both Rel-15 and Rel-16, a UDSF may be defined locally to DCs, while they need to store same data, but how to replicate data and keep data in synchronization is not described.

SUMMARY

A method for managing storage resources in a network system is described. The method includes registering, by a storage resource controller, with a network repository function; receiving, by the storage resource controller, an operation request from a consumer service; selecting, by the storage resource controller, a resource management instance from a plurality of resource management instances managed by the storage resource controller for assignment to the consumer service; forwarding, by the storage resource controller, the operation request to the selected resource management instance; receiving, by the storage resource controller, an operation response from the selected resource management instance; and forwarding, by the storage resource controller, the operation response to the consumer service.

A non-transitory machine-readable storage medium is described that provides instructions that, if executed by a processor, will cause said processor to perform operations. The operations include registering, by a storage resource controller, with a network repository function; receiving, by the storage resource controller, an operation request from a consumer service; selecting, by the storage resource controller, a resource management instance from a plurality of resource management instances managed by the storage resource controller for assignment to the consumer service; forwarding, by the storage resource controller, the operation request to the selected resource management instance; receiving, by the storage resource controller, an operation response from the selected resource management instance; and forwarding, by the storage resource controller, the operation response to the consumer service.

An apparatus for managing storage resources in a network system is described. The apparatus comprises processing circuitry and a memory, the memory containing instructions executable by the processing circuitry whereby the apparatus is operative to register, by a storage resource controller, with a network repository function; receive, by the storage resource controller, an operation request from a consumer service; select, by the storage resource controller, a resource management instance from a plurality of resource management instances managed by the storage resource controller for assignment to the consumer service; forward, by the storage resource controller, the operation request to the selected resource management instance; receive, by the storage resource controller, an operation response from the selected resource management instance; and forward, by the storage resource controller, the operation response to the consumer service.

The storage resource controller (i.e., an Unstructured Data Storage Function (UDSF) controller) and the method for managing the resource management instances (i.e., UDSF instances) provide several advantages. For example, these techniques define a way for Rel-15 network functions to support deployment of multiple storage resource controllers (i.e., one or more network functions are assigned to one storage resource controller while other network functions are assigned different storage resource controllers). Further, the techniques described herein define a way to support consumers services within a set (e.g., acting as a Nudsf_UDM service consumer) being assigned to the same resource management instance of a storage resource controller. Accordingly, these techniques define ways to (1) support dependent consumers/services accessing the same storage resource and (2) support deployments of the same local instances of storage resources in different areas (e.g., datacenters).

BRIEF DESCRIPTION OF THE DRAWINGS

The invention may best be understood by referring to the following description and accompanying drawings that are used to illustrate embodiments of the invention. In the drawings.

DETAILED DESCRIPTION

The following description describes methods and apparatus for managing data storage for network functions in a network system. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

Figure 1:
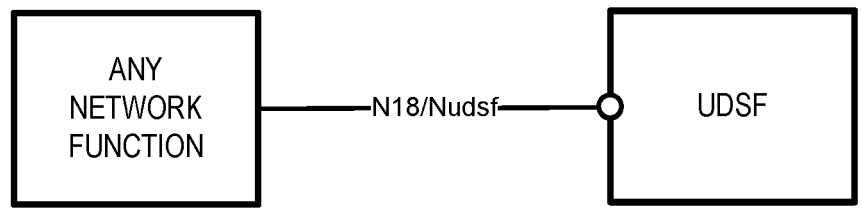
FIG. 1 shows a data storage architecture for unstructured data from any network function.
Figure 2A:
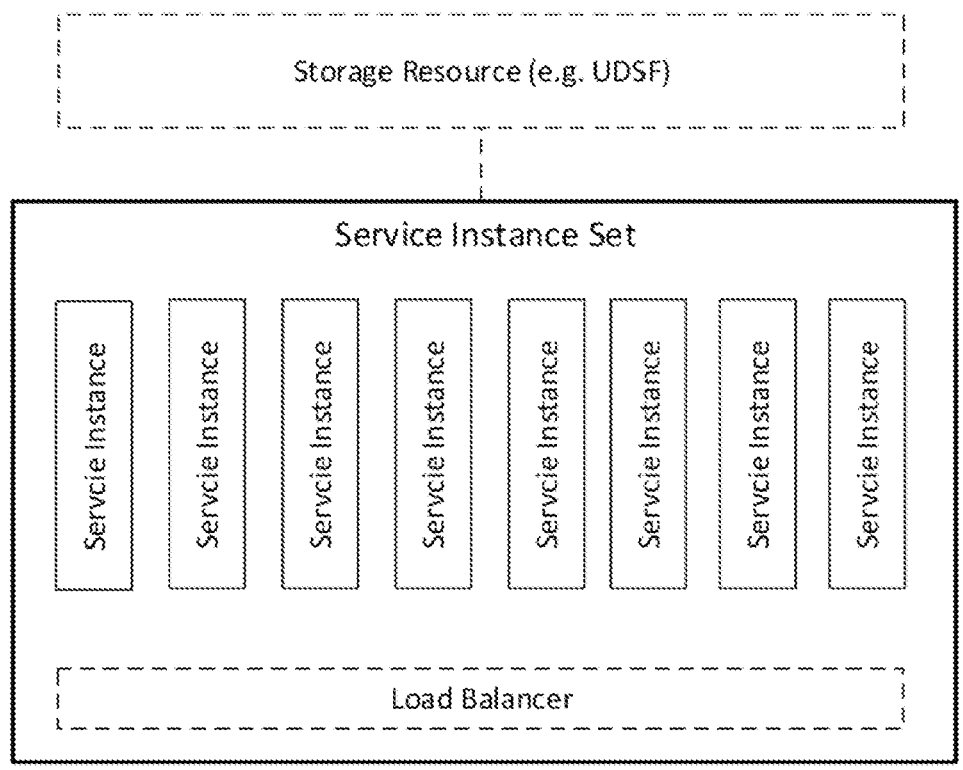
FIG. 2A shows a service instance set with a storage resource accessible to each service instance and associated with a single datacenter.
Figure 2B:
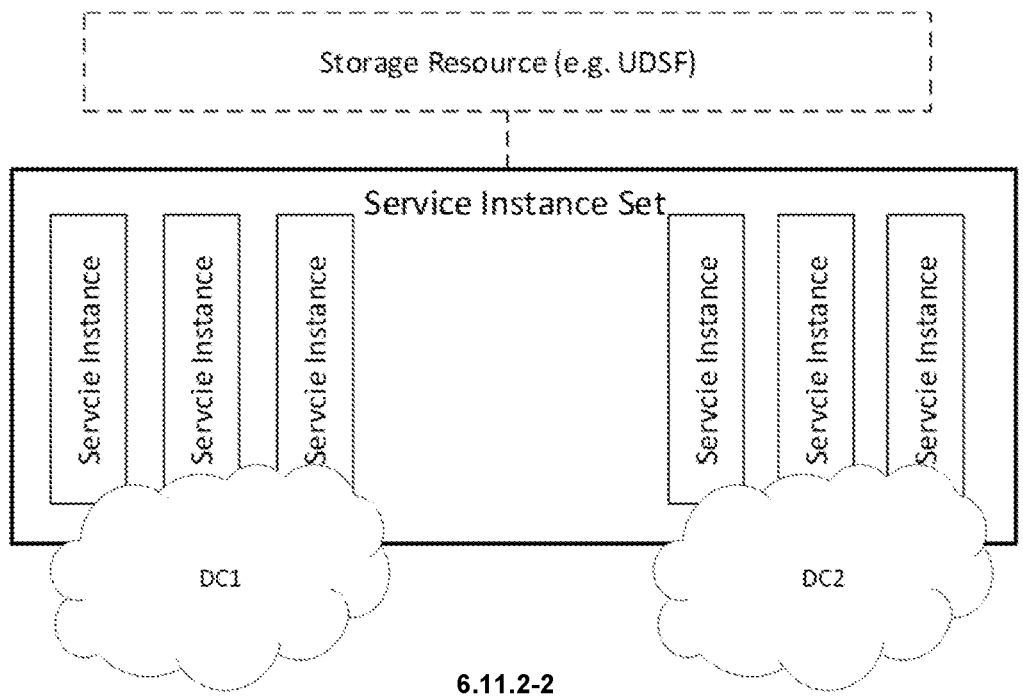
FIG. 2B shows a service instance set with a storage resource accessible to each service instance and associated with two datacenters.
Figure 3:
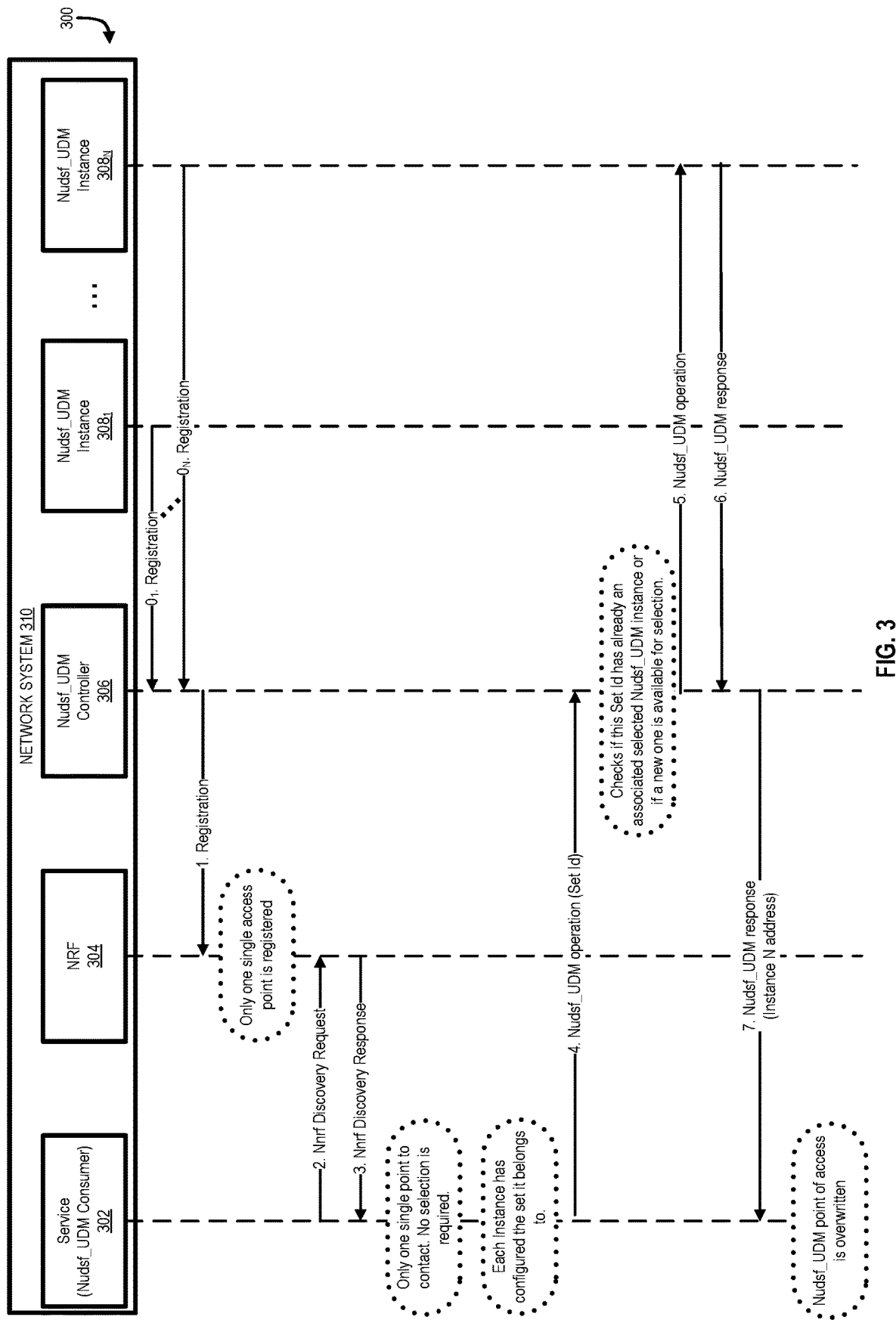
FIG. 3 shows a sequence diagram, according to one embodiment, that describes a method for managing data storage for network functions in a network system.

FIG. 3 shows a sequence diagram 300, according to one embodiment, that describes a method for managing data storage for network functions in a network system. The sequence diagram 300 in FIG. 3 illustrates an Unstructured Data Storage Function (UDSF) controller (i.e., a Nudsf_UDM controller 306, which can be referred to as the UDSF controller 306 or a storage resource controller 306) that acts as a frontend for the multiplicity of UDSF instances (i.e., the Nudsf_UDM instances $308_1$-$308_N$, which can be referred to as the UDSF instances $308_1$-$308_N$ or the resource management instances $308_1$-$308_N$) in the network system/deployment 310. Accordingly, as will be described in greater detail below, the sequence diagram 300 illustrates a method for managing the plurality of UDSF instances $308_1$-$308_N$ of the UDSF controller 306 for use by the service 302. Although shown with a single service 302 and a single UDSF controller 306, which manages a corresponding set of UDSF instances $308_1$-$308_N$, the techniques described herein can be extended to multiple services 302 and multiple UDSF controllers 306, which each manage corresponding sets of UDSF instances 308.

As shown in the sequence diagram 300 of FIG. 3, each of the UDSF instances $308_1$-$308_N$ (i.e., the UDSF instances 308 used for the deployed database/datacenter solution) registers with the UDSF controller 306. In particular, each of the UDSF instances $E08_1$-$308_N$, performs a corresponding registration with the UDSF controller 306 at operations $0_1$-$0_N$, respectively. This registration is internal within the logically unique UDSF controller 306. However, to allow UDSF instances 308 from different vendors to operate seamlessly, this registration could follow the same standardized registration used with a Network Repository Function (NRF), such that an identifier of each UDSF instance 308 (i.e., a storage identifier (ID)) is provided during the registration. However, in other embodiments, the registration of the UDSF instances 308 could follow a registration process separate from that used with a NRF. For example, each of the UDSF instances $308_1$-$308_N$ can provide an instance registration message to the UDSF controller 306 during operations $0_1$-$0_N$, respectively, and each instance registration message can include a storage identifier of the corresponding UDSF instance 308. In some embodiments, the UDSF instances 308 can register with/in the NRF 304 to be accessed by the UDSF controller 306. In these embodiments, the registration of the UDSF instances 308 may not be visible to other elements in the network system 310 but the registration of the UDSF controller 306 with the NRF 304, which will reveal the registered UDSF instances 308, will be visible to other elements in the network system 310 via the UDSF controller 306. In particular, initially only the UDSF controller 306 is visible to elements in the network system 310 (e.g., the service 302). However, after an initial connection/interaction with the UDSF controller 306, elements of the network system 310 can access the UDSF instances 308 directly based on resource information provided initially by the UDSF controller 306 for accessing respective UDSF instances 308.

At operation 1, the UDSF controller 306 registers into/with the NRF 304 by transmitting a registrations message to the NRF 304. From the perspective of the NRF 304 and from the perspective of each 3rd Generation Partnership Project (3GPP) consumer (e.g., the service (Nudsf_UDM Consumer) 302, which can be referred to as the service 302, the consumer 302, or the consumer service 302), the UDSF controller 306 acts as the final provider for the service 302. However, from another perspective, the UDSF controller 306 is not the final provider, but instead the UDSF controller 306 is in charge of managing the UDSF instances 308 in the network 310 and the UDSF instances 308 are viewed as the final providers. When a new UDSF instance 308 is created or deleted, the UDSF controller 306 gets this information from a cloud orchestrator for registration. The UDSF controller 306 may also receive information that an UDSF instance 308 has changed its NRF profile (i.e., modified some of its properties). In any case, a single point of access is provided between the NRF 304 and the UDSF controller 306 and/or the UDSF instances $308_1$-$308_N$ such that selection is not required. However, in other embodiments, multiple points of access may be provided such that the consumer service 302 can select a point for access.

At operation 2, the service 302 (i.e., the Nudsf_UDM consumer) provides a discovery request (e.g., a Nnrf discovery request) to the NRF 304. The discovery request seeks to discover the NRF 304 for subsequent usage. In one embodiment, the service 302 can operate according to 3GPP TS 23.501 v15.2.0 "System Architecture for 5G System" and/or a network function to discover the NRF 304.

At operation 3, in response to the discovery request (e.g., a Nnrf discovery request), the NRF 304 provides a discovery response (e.g., a Nnrf discovery response) to the service 302. Accordingly, the service 302 has completed its discovery of the NRF 304. In one embodiment, the discovery response includes an identifier and/or address of the UDSF controller 306 such that the service 302 can access the UDSF controller 306 for handling operation requests in relation to the UDSF instances 308. In this fashion, a single point of access is provided to the service 302 in relation to the UDSF controller 306 such that the service 302 does not need to perform a selection (e.g., selection of an UDSF instance 308) to request an operation (e.g., an Nudsf_UDM operation).

At operation 4, the service 302 provides an operation request (e.g., a Nudsf_UDM operation request) towards the single access point, which, as described above, corresponds to the UDSF controller 306. Each service 302 may have configured a set to which the service 302 belongs. The UDSF controller 306 checks if a received set identifier of the operation request has already been assigned to a UDSF instance 308. If an assignment has already been made, the UDSF controller 306 forwards the operation request to the selected/associated UDSF instance 308. If an assignment has not already been made, the UDSF controller 306 first selects an available UDSF instance 308, which can be based on different criteria, including load of the UDSF instances $308_1$-$308_N$, and assigns that USDSF instance 308 to the set identifier. The selected/associated UDSF instance identifiers and their association with corresponding services 302 is stored in the UDSF controller 306. Accordingly, the UDSF controller 306 tracks (1) identifiers of UDSF instances $308_1$-$308_N$, (2) identifiers of one or more services 302, and (3) associations between the identifiers of UDSF instances $308_1$-$308_N$ and the identifiers of one or more services 302.

At operation 5, the UDSF controller 306 forwards the operation request (e.g., the Nudsf_UDM operation), which was initially sent/provided by the service 302 to the corresponding/selected/associated UDSF instance 308. For instance, in the example shown in FIG. 3, the service 302 and corresponding set identifier are associated with the UDSF instance $308_N$. Accordingly, the UDSF controller 306 forwards the operation request to the UDSF instance $308_N$.

At operation 6, the UDSF instance 308, which received the operation request at operation 5, sends an operation response back to the UDSF controller 306. For example, as shown in FIG. 3, the UDSF instance $308_N$ received the operation request at operation 5. Accordingly, in this example, the UDSF instance $308_N$ transmits the operation response to the UDSF controller 306 at operation 6. In some embodiments, instead of sending the operation response to the UDSF controller 306, the UDSF instance $308_N$ sends the operation response directly to the server 302 (i.e., the final consumer). In these embodiments, the operation request from operation 5 includes the address/identifier of the service 302 such that the UDSF instance 308 can directly send the operation response to the service 302 at operation 6.

At operation 7, when the operation response was provided to the UDSF controller 306, the UDSF controller 306 provides the operation response to the service 302. In one embodiment, the operation response provided to the service 302 includes the address of the UDSF instance 308 that was selected to store the corresponding set information. The service 302 may thereafter overwrite information it received from the NRF 302 during discovery (e.g., during operations 2 and/or 3). This allows that next operation requests to be sent directly to the corresponding UDSF instance 308 and avoids intermediate forwarding operations by the UDSF controller 306.

As described above, the UDSF controller 306 manages and keeps track of multiple UDSF instances 308 (i.e., multiple Nudsf_UDM instances). Although described in relation to a set identifier (Set Id), in some embodiments the set identifier (Set Id) can be replaced by a generic parameter. For example, a storage resource group, which includes different categories to cover different needs, can be used in place of a set identifier. In particular, storage resource groups are introduced to refer to all the consumer instances/services 302 that are required to use the same storage resource to access shared data (i.e., all consumer instances/service 302 within a set, a deployment unit, a network function, or a group of network functions can access the same storage resources). The UDSF controller 306 can either assign an UDSF instance 308 to each storage resource group (i.e., consumer service set, consumer deployment unit, network function, or a group of network functions) or the UDSF controller 306 selects the UDSF instance 308 already assigned to a previous consumer/service 302 for the same storage resource group.

In some embodiments, a local definition of the UDSF controller 306 (e.g., Nudsf_UDM) can be used in the same area (e.g. a datacenter) as the consumer/services 302 even if another UDSF instance 308 for the same storage resource group is already assigned in a different area (e.g., a different datacenter). In this case, the UDSF controller 306 can define replication channels to ensure corresponding UDSF instances 308 in both areas are synchronized (i.e., not conflicting).

Similarly, at operation 4, in the above described sequence diagram 300, a consumer/service 302 can include a deployment unit identifier, which identifies a group for the consumer/service 302 and at least one other service 302 (i.e., the deployment unit identifier corresponds to two consumers/services 302). In this case, the UDSF controller 306 can check whether another consumer/service 302 in the deployment unit has already requested access to a UDSF instance 308 (i.e., a UDSF instance 308 is already assigned for the deployment unit). If yes, the same UDSF instance 308 is selected. If not, a new UDSF instance 308 is assigned and the UDSF controller 306 tracks/records this assignment.

In particular, at operation 4 in the above described sequence diagram 300, the service 302 provides its own identifier and the UDSF controller 306 checks whether a UDSF instance 308 is already assigned to identifier. This technique can be similarly applied with set identifiers and deployment unit identifiers.

In some embodiments, each area (e.g., each datacenter) may have local access to a UDSF instance 308. In these embodiments, the UDSF controller 306 may always assign a local UDSF instance 308 if none is assigned to a consumer/service 302. However, if there is already a UDSF instance 308 assigned to a consumer/service 302 but it is local to a different area (e.g., a different datacenter or region), then the local UDSF controller 306 may determine (e.g., based on operator policy) to assign a new local UDSF instance 308 to the consumer/service 308, which will optimize access and minimize latency. In this case, a UDSF controller 306 can establish a replication/synchronization channel between both UDSF instances 308 to ensure data consistency.

In one embodiment, the UDSF controller 306 could be extended to manage a plurality of local database instances and each local database instance is stored in a different Virtual Network Function (VNF). In this embodiment, a first instance of service 302 is deployed in the same VNF as the local database instance that will serve as the storage solution. In this case, this local database instance offers a native Application Programming Interface (API) rather than the service 302 and the communication from service 302 to this local database instance is internal to the VNF. In particular, the service 302 may be deployed in different VNFs (e.g., when placed in different datacenters). To ensure local access for service 302 in each datacenter to the same context, there is a need for a controller (e.g., a local database controller) that takes care of establishment of replication/synchronization channels between both local databases to ensure data consistency.

Figure 4:
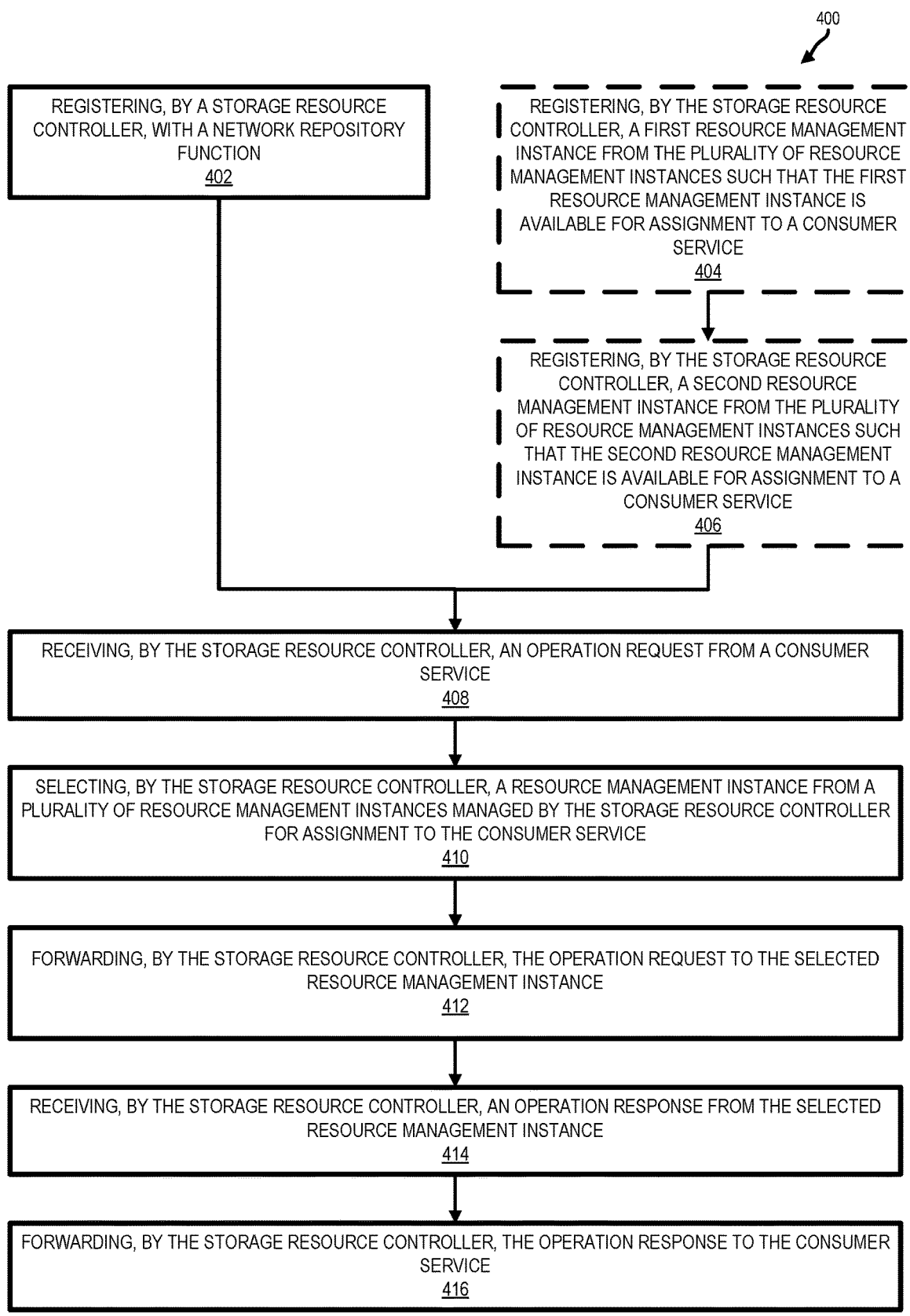
FIG. 4 shows a method for managing storage resources in a network system, according to one example embodiment.

Turning now to FIG. 4, a method 400 will be described for managing storage resources in a network system, according to one example embodiment. The operations in the flow diagram will be described with reference to the exemplary embodiments of the other figures. However, it should be understood that the operations of the flow diagram can be performed by embodiments of the invention other than those discussed with reference to the other figures, and the embodiments of the invention discussed with reference to these other figures can perform operations different than those discussed with reference to the flow diagrams.

As shown in FIG. 4, the method 400 may commence at operation 402 a storage resource controller (e.g., the UDSF controller 306) registering with a network repository function (e.g., the NRF 304).

Prior to, simultaneous with, or during an overlapping time period with registration by the storage resource controller at operation 402, a first resource management instance (e.g., a UDSF instance 308) from a plurality of resource management instances (e.g., the UDSF instances $308_1$-$308_N$) registers at operation 404 with the storage resource controller such that the first resource management instance is available for assignment to a consumer service receiving (e.g., the service 302).

Similarly, prior to, simultaneous with, or during an overlapping time period with registration by the storage resource controller at operation 402, a second resource management instance (e.g., a UDSF instance 308) from the plurality of resource management instances (e.g., the UDSF instances $308_1$-$308_N$) registers at operation 406 with the storage resource controller such that the second resource management instance is available for assignment to a consumer service receiving (e.g., the service 302).

Following the operations 402-406, the storage resource controller receives an operation request from a consumer service (e.g., the service 302) at operation 408.

At operation 410, the storage resource controller selects a resource management instance from the plurality of resource management instances managed by the storage resource controller for assignment to the consumer service. In one embodiment, selecting the selected resource management instance comprises determining that the first resource management instance is already assigned to the consumer service such that the first resource management instance is the selected resource management instance and is to be used for handling operation requests from the consumer service. In another embodiment, selecting the selected resource management instance comprises determining that a third resource management instance is already assigned to the consumer service and the third resource management instance is outside a preferred area associated with the consumer service. In this embodiment, in response to determining that the third resource management instance is already assigned to the consumer service and the third resource management instance is outside the preferred area associated with the consumer service, the first resource management instance is selected as the selected resource management instance, wherein the selected first resource management instance is local to a location of the consumer service and data consistency is established between the third resource management instance and the first resource management instance. In yet another embodiment, selecting the selected resource management instance comprises determining that no resource management instance from the plurality of resource management instances is assigned to the consumer service. In this embodiment, in response to determining that no resource management instance from the plurality of resource management instances is assigned to the consumer service, either the first resource management instance or the second resource management instance is selected as the selected resource management instance. In some embodiments, the selection of the second resource management instance as the selected resource management instance is based on a set of criteria, including one or more of (1) a load of the first resource management instance, (2) a load of the second resource management instance, and (3) a location or area of the consumer service.

In some embodiments, the resource management controller tracks (1) identifiers of resource management instances from the plurality of resource management instances, (2) identifiers of one or more consumer services, and (3) associations between the identifiers of resource management instances and the identifiers of the one or more consumer services. In some of these embodiments, the identifiers of the resource management instances include a set identifier or deployment unit identifier, and the first resource management instance is associated with the set identifier, the deployment unit identifier, or a group identifier.

At operation 412, the storage resource controller forwards the operation request to the selected resource management instance.

At operation 414, the storage resource controller receives an operation response from the selected resource management instance.

At operation 416, the storage resource controller forwards the operation response to the consumer service.

In some embodiments, the consumer service is to provide a discovery message to the network repository function and the network repository function is to provide a discovery response to the consumer service in response to the discovery message. In these embodiments, the discovery response includes an address of the resource management controller such that the consumer service is to transmit the operation request to the resource management controller via the address of the resource management controller.

Additionally, in some embodiments, the operation response includes an address of the determined resource management instance such that the consumer service is to transmit subsequent operation requests directly to the resource management instance.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, solid state drives, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors (e.g., wherein a processor is a microprocessor, controller, microcontroller, central processing unit, digital signal processor, application specific integrated circuit, field programmable gate array, other electronic circuitry, a combination of one or more of the preceding) coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) (NI(s)) to establish network connections (to transmit and/or receive code and/or data using propagating signals) with other electronic devices. For example, the set of physical NIs (or the set of physical NI(s) in combination with the set of processors executing code) may perform any formatting, coding, or translating to allow the electronic device to send and receive data whether over a wired and/or a wireless connection. In some embodiments, a physical NI may comprise radio circuitry capable of receiving data from other electronic devices over a wireless connection and/or sending data out to other devices via a wireless connection. This radio circuitry may include transmitter(s), receiver(s), and/or transceiver(s) suitable for radiofrequency communication. The radio circuitry may convert digital data into a radio signal having the appropriate parameters (e.g., frequency, timing, channel, bandwidth, etc.). The radio signal may then be transmitted via antennas to the appropriate recipient(s). In some embodiments, the set of physical NI(s) may comprise network interface controller(s) (NICs), also known as a network interface card, network adapter, or local area network (LAN) adapter. The NIC(s) may facilitate in connecting the electronic device to other electronic devices allowing them to communicate via wire through plugging in a cable to a physical port connected to a NIC. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

Figure 5A:
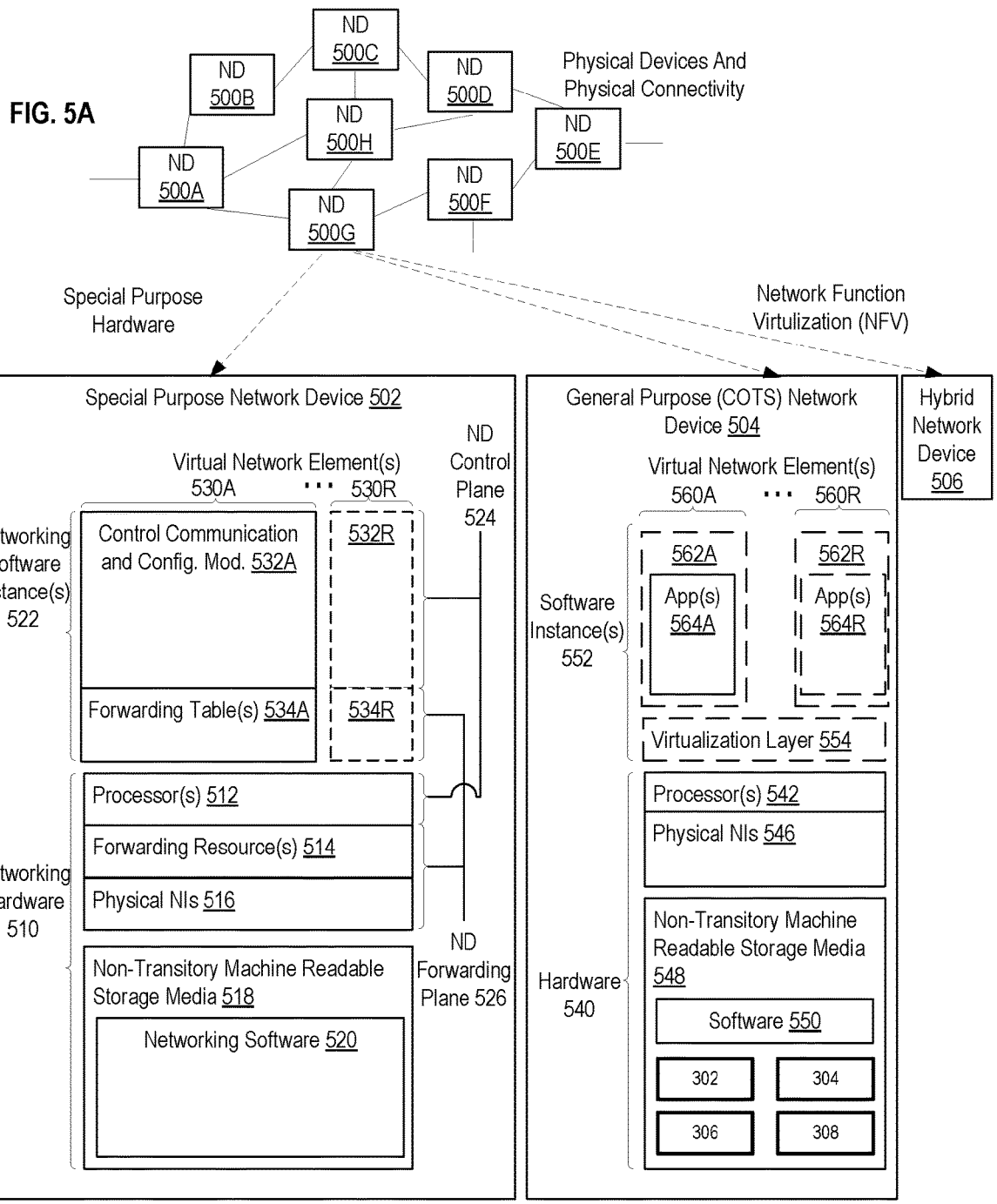
FIG. 5A illustrates connectivity between network devices (NDs) within an exemplary network, as well as three exemplary implementations of the NDs, according to some embodiments of the invention.

FIG. 5A illustrates connectivity between network devices (NDs) within an exemplary network, as well as three exemplary implementations of the NDs, according to some embodiments of the invention. FIG. 5A shows NDs 500A-H, and their connectivity by way of lines between 500A-500B, 500B-500C, 500C-500D, 500D-500E, 500E-500F, 500F-500G, and 500A-500G, as well as between 500H and each of 500A, 500C, 500D, and 500G. These NDs are physical devices, and the connectivity between these NDs can be wireless or wired (often referred to as a link). An additional line extending from NDs 500A, 500E, and 500F illustrates that these NDs act as ingress and egress points for the network (and thus, these NDs are sometimes referred to as edge NDs; while the other NDs may be called core NDs).

Two of the exemplary ND implementations in FIG. 5A are: 1) a special-purpose network device 502 that uses custom application-specific integrated-circuits (ASICs) and a special-purpose operating system (OS); and 2) a general purpose network device 504 that uses common off-the-shelf (COTS) processors and a standard OS.

The special-purpose network device 502 includes networking hardware 510 comprising a set of one or more processor(s) 512, forwarding resource(s) 514 (which typically include one or more ASICs and/or network processors), and physical network interfaces (NIs) 516 (through which network connections are made, such as those shown by the connectivity between NDs 500A-H), as well as non-transitory machine readable storage media 518 having stored therein networking software 520. During operation, the networking software 520 may be executed by the networking hardware 510 to instantiate a set of one or more networking software instance(s) 522. Each of the networking software instance(s) 522, and that part of the networking hardware 510 that executes that network software instance (be it hardware dedicated to that networking software instance and/or time slices of hardware temporally shared by that networking software instance with others of the networking software instance(s) 522), form a separate virtual network element 530A-R. Each of the virtual network element(s) (VNEs) 530A-R includes a control communication and configuration module 532A-R (sometimes referred to as a local control module or control communication module) and forwarding table(s) 534A-R, such that a given virtual network element (e.g., 530A) includes the control communication and configuration module (e.g., 532A), a set of one or more forwarding table(s) (e.g., 534A), and that portion of the networking hardware 510 that executes the virtual network element (e.g., 530A).

The special-purpose network device 502 is often physically and/or logically considered to include: 1) a ND control plane 524 (sometimes referred to as a control plane) comprising the processor(s) 512 that execute the control communication and configuration module(s) 532A-R; and 2) a ND forwarding plane 526 (sometimes referred to as a forwarding plane, a data plane, or a media plane) comprising the forwarding resource(s) 514 that utilize the forwarding table(s) 534A-R and the physical NIs 516. By way of example, where the ND is a router (or is implementing routing functionality), the ND control plane 524 (the processor(s) 512 executing the control communication and configuration module(s) 532A-R) is typically responsible for participating in controlling how data (e.g., packets) is to be routed (e.g., the next hop for the data and the outgoing physical NI for that data) and storing that routing information in the forwarding table(s) 534A-R, and the ND forwarding plane 526 is responsible for receiving that data on the physical NIs 516 and forwarding that data out the appropriate ones of the physical NIs 516 based on the forwarding table(s) 534A-R.

Figure 5B:
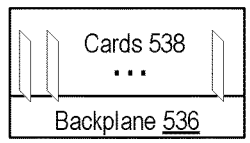
FIG. 5B illustrates an exemplary way to implement a special-purpose network device according to some embodiments of the invention.

FIG. 5B illustrates an exemplary way to implement the special-purpose network device 502 according to some embodiments of the invention. FIG. 5B shows a special-purpose network device including cards 538 (typically hot pluggable). While in some embodiments the cards 538 are of two types (one or more that operate as the ND forwarding plane 526 (sometimes called line cards), and one or more that operate to implement the ND control plane 524 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 536 (e.g., a first full mesh coupling the line cards and a second full mesh coupling all of the cards).

Returning to FIG. 5A, the general purpose network device 504 includes hardware 540 comprising a set of one or more processor(s) 542 (which are often COTS processors) and physical NIs 546, as well as non-transitory machine readable storage media 548 having stored therein software 550, the service 302, the NRF 304, the UDSF controller 306, and/or the UDSF instances 308. During operation, the processor(s) 542 execute the software 550 to instantiate one or more sets of one or more applications 564A-R. While one embodiment does not implement virtualization, alternative embodiments may use different forms of virtualization. For example, in one such alternative embodiment the virtualization layer 554 represents the kernel of an operating system (or a shim executing on a base operating system) that allows for the creation of multiple instances 562A-R called software containers that may each be used to execute one (or more) of the sets of applications 564A-R; where the multiple software containers (also called virtualization engines, virtual private servers, or jails) are user spaces (typically a virtual memory space) that are separate from each other and separate from the kernel space in which the operating system is run; and where the set of applications running in a given user space, unless explicitly allowed, cannot access the memory of the other processes. In another such alternative embodiment the virtualization layer 554 represents a hypervisor (sometimes referred to as a virtual machine monitor (VMM)) or a hypervisor executing on top of a host operating system, and each of the sets of applications 564A-R is run on top of a guest operating system within an instance 562A-R called a virtual machine (which may in some cases be considered a tightly isolated form of software container) that is run on top of the hypervisor—the guest operating system and application may not know they are running on a virtual machine as opposed to running on a "bare metal" host electronic device, or through para-virtualization the operating system and/or application may be aware of the presence of virtualization for optimization purposes. In yet other alternative embodiments, one, some or all of the applications are implemented as unikernel(s), which can be generated by compiling directly with an application only a limited set of libraries (e.g., from a library operating system (LibOS) including drivers/libraries of OS services) that provide the particular OS services needed by the application. As a unikernel can be implemented to run directly on hardware 540, directly on a hypervisor (in which case the unikernel is sometimes described as running within a LibOS virtual machine), or in a software container, embodiments can be implemented fully with unikernels running directly on a hypervisor represented by virtualization layer 554, unikernels running within software containers represented by instances 562A-R, or as a combination of unikernels and the above-described techniques (e.g., unikernels and virtual machines both run directly on a hypervisor, unikernels and sets of applications that are run in different software containers).

The instantiation of the one or more sets of one or more applications 564A-R, as well as virtualization if implemented, are collectively referred to as software instance(s) 552. Each set of applications 564A-R, corresponding virtualization construct (e.g., instance 562A-R) if implemented, and that part of the hardware 540 that executes them (be it hardware dedicated to that execution and/or time slices of hardware temporally shared), forms a separate virtual network element(s) 560A-R.

The virtual network element(s) 560A-R perform similar functionality to the virtual network element(s) 530A-R—e.g., similar to the control communication and configuration module(s) 532A and forwarding table(s) 534A (this virtualization of the hardware 540 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). While embodiments of the invention are illustrated with each instance 562A-R corresponding to one VNE 560A-R, alternative embodiments may implement this correspondence at a finer level granularity (e.g., line card virtual machines virtualize line cards, control card virtual machine virtualize control cards, etc.); it should be understood that the techniques described herein with reference to a correspondence of instances 562A-R to VNEs also apply to embodiments where such a finer level of granularity and/or unikernels are used.

In certain embodiments, the virtualization layer 554 includes a virtual switch that provides similar forwarding services as a physical Ethernet switch. Specifically, this virtual switch forwards traffic between instances 562A-R and the physical NI(s) 546, as well as optionally between the instances 562A-R; in addition, this virtual switch may enforce network isolation between the VNEs 560A-R that by policy are not permitted to communicate with each other (e.g., by honoring virtual local area networks (VLANs)).

The third exemplary ND implementation in FIG. 5A is a hybrid network device 506, which includes both custom ASICs/special-purpose OS and COTS processors/standard OS in a single ND or a single card within an ND. In certain embodiments of such a hybrid network device, a platform VM (i.e., a VM that implements the functionality of the special-purpose network device 502) could provide for para-virtualization to the networking hardware present in the hybrid network device 506.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 530A-R, VNEs 560A-R, and those in the hybrid network device 506) receives data on the physical NIs (e.g., 516, 546) and forwards that data out the appropriate ones of the physical NIs (e.g., 516, 546). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP), Transmission Control Protocol (TCP), and differentiated services code point (DSCP) values.

Figure 5C:
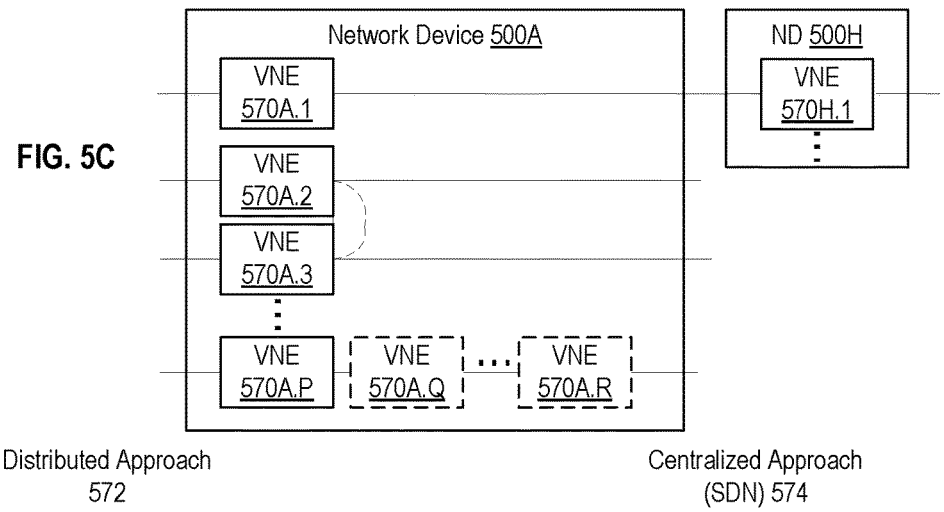
FIG. 5C illustrates various exemplary ways in which virtual network elements (VNEs) may be coupled according to some embodiments of the invention.

FIG. 5C illustrates various exemplary ways in which VNEs may be coupled according to some embodiments of the invention. FIG. 5C shows VNEs 570A.1-570A.P (and optionally VNEs 570A.Q-570A.R) implemented in ND 500A and VNE 570H.1 in ND 500H. In FIG. 5C, VNEs 570A.1-P are separate from each other in the sense that they can receive packets from outside ND 500A and forward packets outside of ND 500A; VNE 570A.1 is coupled with VNE 570H.1, and thus they communicate packets between their respective NDs; VNE 570A.2-570A.3 may optionally forward packets between themselves without forwarding them outside of the ND 500A; and VNE 570A.P may optionally be the first in a chain of VNEs that includes VNE 570A.Q followed by VNE 570A.R (this is sometimes referred to as dynamic service chaining, where each of the VNEs in the series of VNEs provides a different service— e.g., one or more layer 4-7 network services). While FIG. 5C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 5A, for example, may form part of the Internet or a private network; and other electronic devices (not shown; such as end user devices including workstations, laptops, netbooks, tablets, palm tops, mobile phones, smartphones, phablets, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 5A may also host one or more such servers (e.g., in the case of the general purpose network device 504, one or more of the software instances 562A-R may operate as servers; the same would be true for the hybrid network device 506; in the case of the special-purpose network device 502, one or more such servers could also be run on a virtualization layer executed by the processor(s) 512); in which case the servers are said to be co-located with the VNEs of that ND.

A virtual network is a logical abstraction of a physical network (such as that in FIG. 5A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network-originated attacks, to avoid malformed route announcements), and management capabilities (e.g., full detection and processing).

Figure 5D:
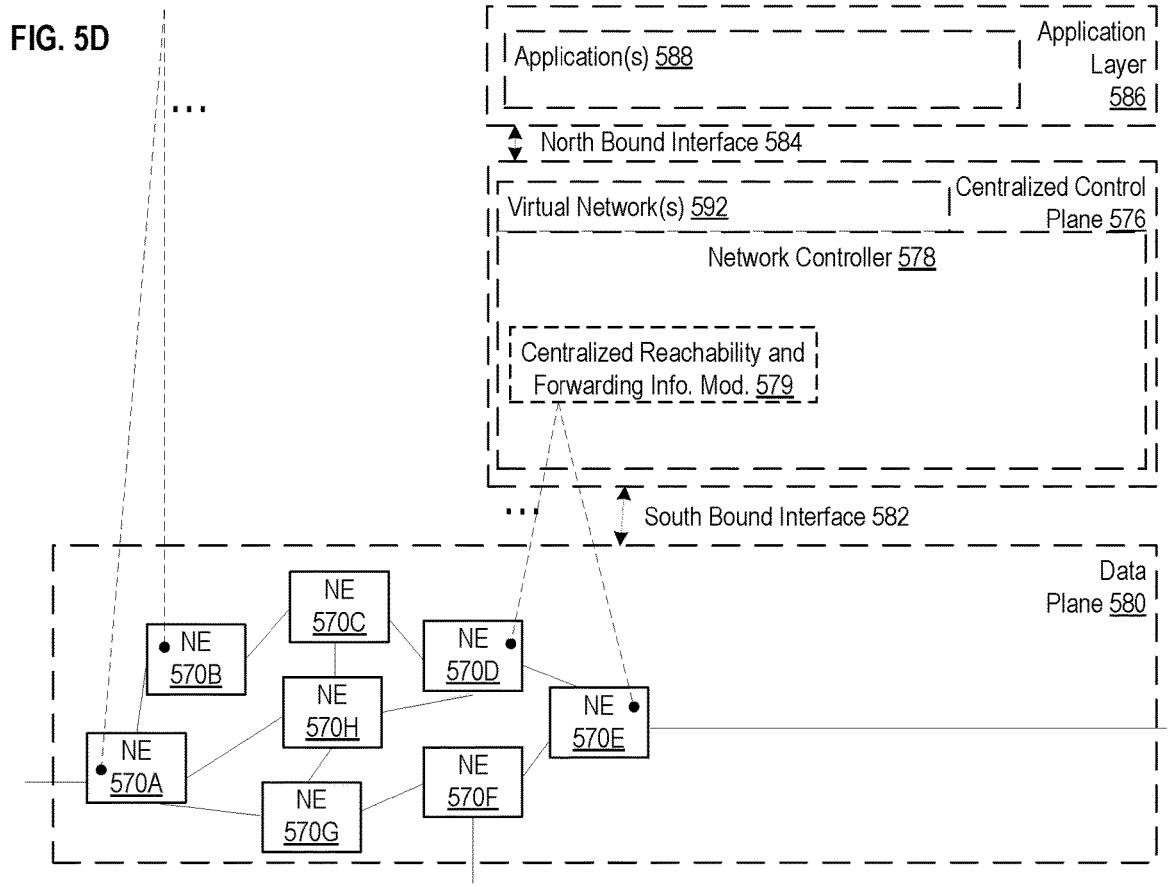
FIG. 5D illustrates a network with a single network element (NE) on each of the NDs, and within this straight forward approach contrasts a traditional distributed approach (commonly used by traditional routers) with a centralized approach for maintaining reachability and forwarding information (also called network control), according to some embodiments of the invention.

FIG. 5D illustrates a network with a single network element on each of the NDs of FIG. 5A, and within this straight forward approach contrasts a traditional distributed approach (commonly used by traditional routers) with a centralized approach for maintaining reachability and forwarding information (also called network control), according to some embodiments of the invention. Specifically, FIG. 5D illustrates network elements (NEs) 570A-H with the same connectivity as the NDs 500A-H of FIG. 5A.

FIG. 5D illustrates that the distributed approach 572 distributes responsibility for generating the reachability and forwarding information across the NEs 570A-H; in other words, the process of neighbor discovery and topology discovery is distributed.

For example, where the special-purpose network device 502 is used, the control communication and configuration module(s) 532A-R of the ND control plane 524 typically include a reachability and forwarding information module to implement one or more routing protocols (e.g., an exterior gateway protocol such as Border Gateway Protocol (BGP), Interior Gateway Protocol(s) (IGP) (e.g., Open Shortest Path First (OSPF), Intermediate System to Intermediate System (IS-IS), Routing Information Protocol (RIP), Label Distribution Protocol (LDP), Resource Reservation Protocol (RSVP) (including RSVP-Traffic Engineering (TE): Extensions to RSVP for LSP Tunnels and Generalized Multi-Protocol Label Switching (GMPLS) Signaling RSVP-TE)) that communicate with other NEs to exchange routes, and then selects those routes based on one or more routing metrics. Thus, the NEs 570A-H (e.g., the processor(s) 512 executing the control communication and configuration module(s) 532A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 524. The ND control plane 524 programs the ND forwarding plane 526 with information (e.g., adjacency and route information) based on the routing structure(s). For example, the ND control plane 524 programs the adjacency and route information into one or more forwarding table(s) 534A-R (e.g., Forwarding Information Base (FIB), Label Forwarding Information Base (LFIB), and one or more adjacency structures) on the ND forwarding plane 526. For layer 2 forwarding, the ND can store one or more bridging tables that are used to forward data based on the layer 2 information in that data. While the above example uses the special-purpose network device 502, the same distributed approach 572 can be implemented on the general purpose network device 504 and the hybrid network device 506.

FIG. 5D illustrates that a centralized approach 574 (also known as software defined networking (SDN)) that decouples the system that makes decisions about where traffic is sent from the underlying systems that forwards traffic to the selected destination. The illustrated centralized approach 574 has the responsibility for the generation of reachability and forwarding information in a centralized control plane 576 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 576 has a south bound interface 582 with a data plane 580 (sometime referred to the infrastructure layer, network forwarding plane, or forwarding plane (which should not be confused with a ND forwarding plane)) that includes the NEs 570A-H (sometimes referred to as switches, forwarding elements, data plane elements, or nodes). The centralized control plane 576 includes a network controller 578, which includes a centralized reachability and forwarding information module 579 that determines the reachability within the network and distributes the forwarding information to the NEs 570A-H of the data plane 580 over the south bound interface 582 (which may use the OpenFlow protocol), the service 302, the NRF 304, the UDSF controller 306, and/or the UDSF instances 308. Thus, the network intelligence is centralized in the centralized control plane 576 executing on electronic devices that are typically separate from the NDs.

For example, where the special-purpose network device 502 is used in the data plane 580, each of the control communication and configuration module(s) 532A-R of the ND control plane 524 typically include a control agent that provides the VNE side of the south bound interface 582. In this case, the ND control plane 524 (the processor(s) 512 executing the control communication and configuration module(s) 532A-R) performs its responsibility for participating in controlling how data (e.g., packets) is to be routed (e.g., the next hop for the data and the outgoing physical NI for that data) through the control agent communicating with the centralized control plane 576 to receive the forwarding information (and in some cases, the reachability information) from the centralized reachability and forwarding information module 579 (it should be understood that in some embodiments of the invention, the control communication and configuration module(s) 532A-R, in addition to communicating with the centralized control plane 576, may also play some role in determining reachability and/or calculating forwarding information—albeit less so than in the case of a distributed approach; such embodiments are generally considered to fall under the centralized approach 574, but may also be considered a hybrid approach).

While the above example uses the special-purpose network device 502, the same centralized approach 574 can be implemented with the general purpose network device 504 (e.g., each of the VNE 560A-R performs its responsibility for controlling how data (e.g., packets) is to be routed (e.g., the next hop for the data and the outgoing physical NI for that data) by communicating with the centralized control plane 576 to receive the forwarding information (and in some cases, the reachability information) from the centralized reachability and forwarding information module 579; it should be understood that in some embodiments of the invention, the VNEs 560A-R, in addition to communicating with the centralized control plane 576, may also play some role in determining reachability and/or calculating forwarding information—albeit less so than in the case of a distributed approach) and the hybrid network device 506. In fact, the use of SDN techniques can enhance the NFV techniques typically used in the general purpose network device 504 or hybrid network device 506 implementations as NFV is able to support SDN by providing an infrastructure upon which the SDN software can be run, and NFV and SDN both aim to make use of commodity server hardware and physical switches.

FIG. 5D also shows that the centralized control plane 576 has a north bound interface 584 to an application layer 586, in which resides application(s) 588. The centralized control plane 576 has the ability to form virtual networks 592 (sometimes referred to as a logical forwarding plane, network services, or overlay networks (with the NEs 570A-H of the data plane 580 being the underlay network)) for the application(s) 588. Thus, the centralized control plane 576 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 5D shows the distributed approach 572 separate from the centralized approach 574, the effort of network control may be distributed differently or the two combined in certain embodiments of the invention. For example: 1) embodiments may generally use the centralized approach (SDN) 574, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach 574, but may also be considered a hybrid approach.

While FIG. 5D illustrates the simple case where each of the NDs 500A-H implements a single NE 570A-H, it should be understood that the network control approaches described with reference to FIG. 5D also work for networks where one or more of the NDs 500A-H implement multiple VNEs (e.g., VNEs 530A-R, VNEs 560A-R, those in the hybrid network device 506). Alternatively or in addition, the network controller 578 may also emulate the implementation of multiple VNEs in a single ND. Specifically, instead of (or in addition to) implementing multiple VNEs in a single ND, the network controller 578 may present the implementation of a VNE/NE in a single ND as multiple VNEs in the virtual networks 592 (all in the same one of the virtual network(s) 592, each in different ones of the virtual network(s) 592, or some combination). For example, the network controller 578 may cause an ND to implement a single VNE (a NE) in the underlay network, and then logically divide up the resources of that NE within the centralized control plane 576 to present different VNEs in the virtual network(s) 592 (where these different VNEs in the overlay networks are sharing the resources of the single VNE/NE implementation on the ND in the underlay network).

Figure 5E:
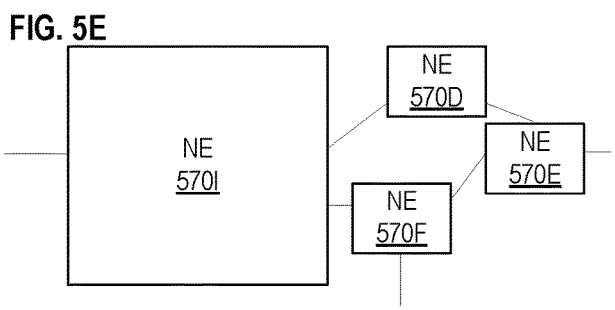
FIG. 5E illustrates the simple case of where each of the NDs implements a single NE, but a centralized control plane has abstracted multiple of the NEs in different NDs into (to represent) a single NE in one of the virtual network(s), according to some embodiments of the invention.
Figure 5F:
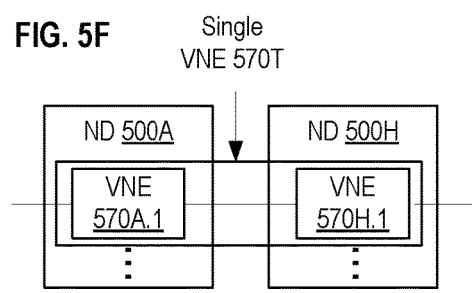
FIG. 5F illustrates a case where multiple VNEs are implemented on different NDs and are coupled to each other, and where a centralized control plane has abstracted these multiple VNEs such that they appear as a single VNE within one of the virtual networks, according to some embodiments of the invention.

On the other hand, FIGS. 5E and 5F respectively illustrate exemplary abstractions of NEs and VNEs that the network controller 578 may present as part of different ones of the virtual networks 592. FIG. 5E illustrates the simple case of where each of the NDs 500A-H implements a single NE 570A-H (see FIG. 5D), but the centralized control plane 576 has abstracted multiple of the NEs in different NDs (the NEs 570A-C and G-H) into (to represent) a single NE 5701 in one of the virtual network(s) 592 of FIG. 5D, according to some embodiments of the invention. FIG. 5E shows that in this virtual network, the NE 5701 is coupled to NE 570D and 570F, which are both still coupled to NE 570E.

FIG. 5F illustrates a case where multiple VNEs (VNE 570A.1 and VNE 570H.1) are implemented on different NDs (ND 500A and ND 500H) and are coupled to each other, and where the centralized control plane 576 has abstracted these multiple VNEs such that they appear as a single VNE 570T within one of the virtual networks 592 of FIG. 5D, according to some embodiments of the invention. Thus, the abstraction of a NE or VNE can span multiple NDs.

While some embodiments of the invention implement the centralized control plane 576 as a single entity (e.g., a single instance of software running on a single electronic device), alternative embodiments may spread the functionality across multiple entities for redundancy and/or scalability purposes (e.g., multiple instances of software running on different electronic devices).

Figure 6:
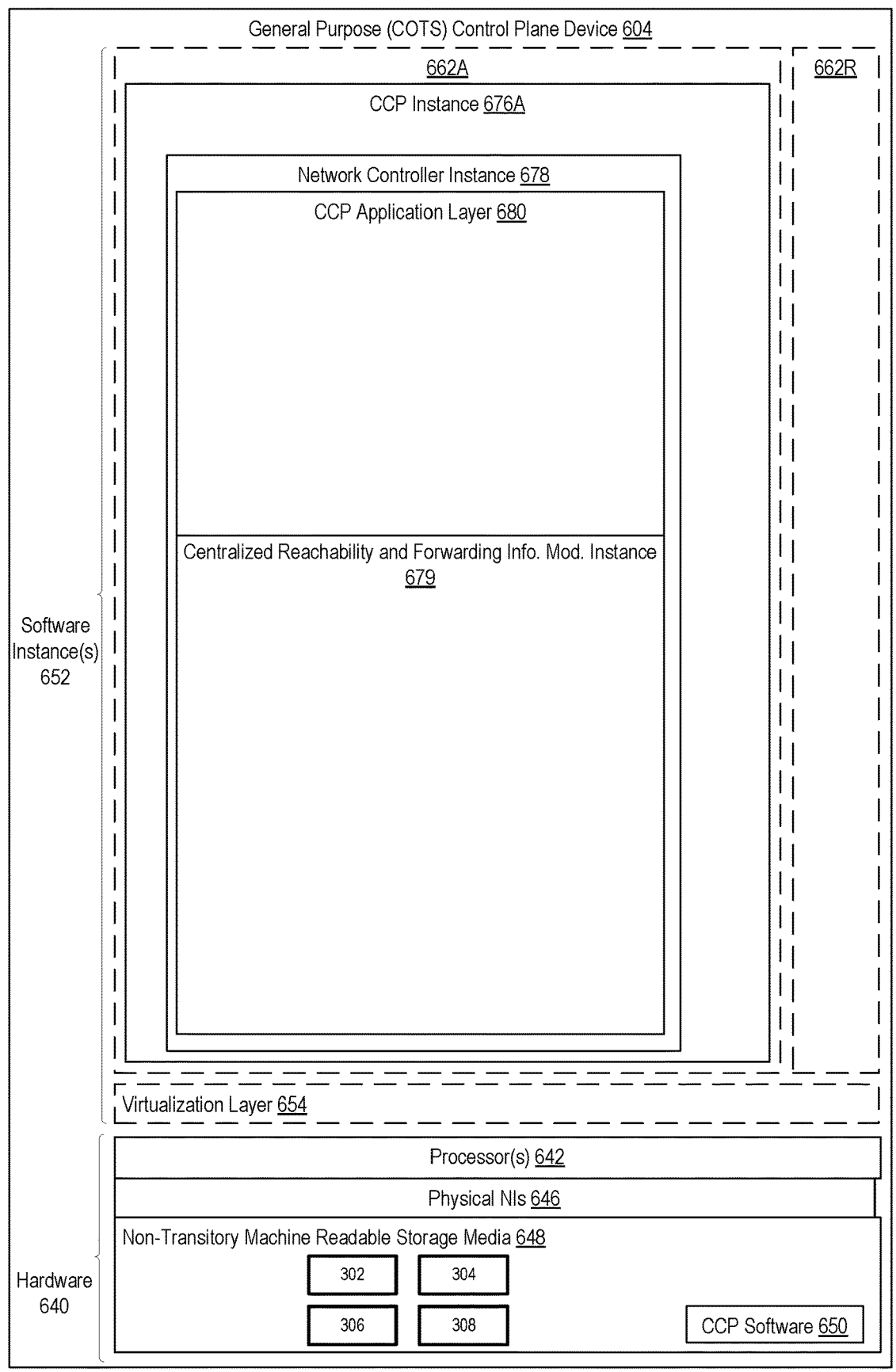
FIG. 6 illustrates a general-purpose control plane device with centralized control plane (CCP), according to some embodiments of the invention.

Similar to the network device implementations, the electronic device(s) running the centralized control plane 576, and thus the network controller 578 including the centralized reachability and forwarding information module 579, may be implemented a variety of ways (e.g., a special purpose device, a general-purpose (e.g., COTS) device, or hybrid device). These electronic device(s) would similarly include processor(s), a set or one or more physical NIs, and a non-transitory machine-readable storage medium having stored thereon the centralized control plane software. For instance, FIG. 6 illustrates, a general-purpose control plane device 604 including hardware 640 comprising a set of one or more processor(s) 642 (which are often COTS processors) and physical NIs 646, as well as non-transitory machine readable storage media 648 having stored therein centralized control plane (CCP) software 650, the service 302, the NRF 304, the UDSF controller 306, and/or the UDSF instances 308.

In embodiments that use compute virtualization, the processor(s) 642 typically execute software to instantiate a virtualization layer 654 (e.g., in one embodiment the virtualization layer 654 represents the kernel of an operating system (or a shim executing on a base operating system) that allows for the creation of multiple instances 662A-R called software containers (representing separate user spaces and also called virtualization engines, virtual private servers, or jails) that may each be used to execute a set of one or more applications; in another embodiment the virtualization layer 654 represents a hypervisor (sometimes referred to as a virtual machine monitor (VMM)) or a hypervisor executing on top of a host operating system, and an application is run on top of a guest operating system within an instance 662A-R called a virtual machine (which in some cases may be considered a tightly isolated form of software container) that is run by the hypervisor; in another embodiment, an application is implemented as a unikernel, which can be generated by compiling directly with an application only a limited set of libraries (e.g., from a library operating system (LibOS) including drivers/libraries of OS services) that provide the particular OS services needed by the application, and the unikernel can run directly on hardware 640, directly on a hypervisor represented by virtualization layer 654 (in which case the unikernel is sometimes described as running within a LibOS virtual machine), or in a software container represented by one of instances 662A-R). Again, in embodiments where compute virtualization is used, during operation an instance of the CCP software 650 (illustrated as CCP instance 676A) is executed (e.g., within the instance 662A) on the virtualization layer 654. In embodiments where compute virtualization is not used, the CCP instance 676A is executed, as a unikernel or on top of a host operating system, on the "bare metal" general purpose control plane device 604. The instantiation of the CCP instance 676A, as well as the virtualization layer 654 and instances 662A-R if implemented, are collectively referred to as software instance(s) 652.

In some embodiments, the CCP instance 676A includes a network controller instance 678. The network controller instance 678 includes a centralized reachability and forwarding information module instance 679 (which is a middleware layer providing the context of the network controller 578 to the operating system and communicating with the various NEs), and an CCP application layer 680 (sometimes referred to as an application layer) over the middleware layer (providing the intelligence required for various network operations such as protocols, network situational awareness, and user-interfaces). At a more abstract level, this CCP application layer 680 within the centralized control plane 576 works with virtual network view(s) (logical view(s) of the network) and the middleware layer provides the conversion from the virtual networks to the physical view.

The centralized control plane 576 transmits relevant messages to the data plane 580 based on CCP application layer 680 calculations and middleware layer mapping for each flow. A flow may be defined as a set of packets whose headers match a given pattern of bits; in this sense, traditional IP forwarding is also flow-based forwarding where the flows are defined by the destination IP address for example; however, in other implementations, the given pattern of bits used for a flow definition may include more fields (e.g., 10 or more) in the packet headers. Different NDs/NEs/VNEs of the data plane 580 may receive different messages, and thus different forwarding information. The data plane 580 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 580, the packet (or a subset of the packet header and content) is typically forwarded to the centralized control plane 576. The centralized control plane 576 will then program forwarding table entries into the data plane 580 to accommodate packets belonging to the flow of the unknown packet. Once a specific forwarding table entry has been programmed into the data plane 580 by the centralized control plane 576, the next packet with matching credentials will match that forwarding table entry and take the set of actions associated with that matched entry.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

Next hop selection by the routing system for a given destination may resolve to one path (that is, a routing protocol may generate one next hop on a shortest path); but if the routing system determines there are multiple viable next hops (that is, the routing protocol generated forwarding solution offers more than one next hop on a shortest path—multiple equal cost next hops), some additional criteria is used—for instance, in a connectionless network, Equal Cost Multi Path (ECMP) (also known as Equal Cost Multi Pathing, multipath forwarding and IP multipath) may be used (e.g., typical implementations use as the criteria particular header fields to ensure that the packets of a particular packet flow are always forwarded on the same next hop to preserve packet flow ordering). For purposes of multipath forwarding, a packet flow is defined as a set of packets that share an ordering constraint. As an example, the set of packets in a particular TCP transfer sequence need to arrive in order, else the TCP logic will interpret the out of order delivery as congestion and slow the TCP transfer rate down.

A Layer 3 (L3) Link Aggregation (LAG) link is a link directly connecting two NDs with multiple IP-addressed link paths (each link path is assigned a different IP address), and a load distribution decision across these different link paths is performed at the ND forwarding plane; in which case, a load distribution decision is made between the link paths.

Some NDs include functionality for authentication, authorization, and accounting (AAA) protocols (e.g., RADIUS (Remote Authentication Dial-In User Service), Diameter, and/or TACACS+ (Terminal Access Controller Access Control System Plus). AAA can be provided through a client/server model, where the AAA client is implemented on a ND and the AAA server can be implemented either locally on the ND or on a remote electronic device coupled with the ND. Authentication is the process of identifying and verifying a subscriber. For instance, a subscriber might be identified by a combination of a username and a password or through a unique key. Authorization determines what a subscriber can do after being authenticated, such as gaining access to certain electronic device information resources (e.g., through the use of access control policies). Accounting is recording user activity. By way of a summary example, end user devices may be coupled (e.g., through an access network) through an edge ND (supporting AAA processing) coupled to core NDs coupled to electronic devices implementing servers of service/content providers. AAA processing is performed to identify for a subscriber the subscriber record stored in the AAA server for that subscriber. A subscriber record includes a set of attributes (e.g., subscriber name, password, authentication information, access control information, rate-limiting information, policing information) used during processing of that subscriber's traffic.

Certain NDs (e.g., certain edge NDs) internally represent end user devices (or sometimes customer premise equipment (CPE) such as a residential gateway (e.g., a router, modem)) using subscriber circuits. A subscriber circuit uniquely identifies within the ND a subscriber session and typically exists for the lifetime of the session. Thus, a ND typically allocates a subscriber circuit when the subscriber connects to that ND, and correspondingly de-allocates that subscriber circuit when that subscriber disconnects. Each subscriber session represents a distinguishable flow of packets communicated between the ND and an end user device (or sometimes CPE such as a residential gateway or modem) using a protocol, such as the point-to-point protocol over another protocol (PPPoX) (e.g., where X is Ethernet or Asynchronous Transfer Mode (ATM)), Ethernet, 802.1Q Virtual LAN (VLAN), Internet Protocol, or ATM). A subscriber session can be initiated using a variety of mechanisms (e.g., manual provisioning a dynamic host configuration protocol (DHCP), DHCP/client-less internet protocol service (CLIPS) or Media Access Control (MAC) address tracking). For example, the point-to-point protocol (PPP) is commonly used for digital subscriber line (DSL) services and requires installation of a PPP client that enables the subscriber to enter a username and a password, which in turn may be used to select a subscriber record. When DHCP is used (e.g., for cable modem services), a username typically is not provided; but in such situations other information (e.g., information that includes the MAC address of the hardware in the end user device (or CPE)) is provided. The use of DHCP and CLIPS on the ND captures the MAC addresses and uses these addresses to distinguish subscribers and access their subscriber records.

A virtual circuit (VC), synonymous with virtual connection and virtual channel, is a connection oriented communication service that is delivered by means of packet mode communication. Virtual circuit communication resembles circuit switching, since both are connection oriented, meaning that in both cases data is delivered in correct order, and signaling overhead is required during a connection establishment phase. Virtual circuits may exist at different layers. For example, at layer 4, a connection oriented transport layer datalink protocol such as Transmission Control Protocol (TCP) may rely on a connectionless packet switching network layer protocol such as IP, where different packets may be routed over different paths, and thus be delivered out of order. Where a reliable virtual circuit is established with TCP on top of the underlying unreliable and connectionless IP protocol, the virtual circuit is identified by the source and destination network socket address pair, i.e. the sender and receiver IP address and port number. However, a virtual circuit is possible since TCP includes segment numbering and reordering on the receiver side to prevent out-of-order delivery. Virtual circuits are also possible at Layer 3 (network layer) and Layer 2 (datalink layer); such virtual circuit protocols are based on connection oriented packet switching, meaning that data is always delivered along the same network path, i.e. through the same NEs/VNEs. In such protocols, the packets are not routed individually and complete addressing information is not provided in the header of each data packet; only a small virtual channel identifier (VCI) is required in each packet; and routing information is transferred to the NEs/VNEs during the connection establishment phase; switching only involves looking up the virtual channel identifier in a table rather than analyzing a complete address. Examples of network layer and datalink layer virtual circuit protocols, where data always is delivered over the same path: X.25, where the VC is identified by a virtual channel identifier (VCI); Frame relay, where the VC is identified by a VCI; Asynchronous Transfer Mode (ATM), where the circuit is identified by a virtual path identifier (VPI) and virtual channel identifier (VCI) pair; General Packet Radio Service (GPRS); and Multiprotocol label switching (MPLS), which can be used for IP over virtual circuits (Each circuit is identified by a label).

Certain NDs (e.g., certain edge NDs) use a hierarchy of circuits. The leaf nodes of the hierarchy of circuits are subscriber circuits. The subscriber circuits have parent circuits in the hierarchy that typically represent aggregations of multiple subscriber circuits, and thus the network segments and elements used to provide access network connectivity of those end user devices to the ND. These parent circuits may represent physical or logical aggregations of subscriber circuits (e.g., a virtual local area network (VLAN), a permanent virtual circuit (PVC) (e.g., for Asynchronous Transfer Mode (ATM)), a circuit-group, a channel, a pseudo-wire, a physical NI of the ND, and a link aggregation group). A circuit-group is a virtual construct that allows various sets of circuits to be grouped together for configuration purposes, for example aggregate rate control. A pseudo-wire is an emulation of a layer 2 point-to-point connection-oriented service. A link aggregation group is a virtual construct that merges multiple physical NIs for purposes of bandwidth aggregation and redundancy. Thus, the parent circuits physically or logically encapsulate the subscriber circuits.

Each VNE (e.g., a virtual router, a virtual bridge (which may act as a virtual switch instance in a Virtual Private LAN Service (VPLS) is typically independently administrable. For example, in the case of multiple virtual routers, each of the virtual routers may share system resources but is separate from the other virtual routers regarding its management domain, AAA (authentication, authorization, and accounting) name space, IP address, and routing database(s). Multiple VNEs may be employed in an edge ND to provide direct network access and/or different classes of services for subscribers of service and/or content providers.

Within certain NDs, "interfaces" that are independent of physical NIs may be configured as part of the VNEs to provide higher-layer protocol and service information (e.g., Layer 3 addressing). The subscriber records in the AAA server identify, in addition to the other subscriber configuration requirements, to which context (e.g., which of the VNEs/NEs) the corresponding subscribers should be bound within the ND. As used herein, a binding forms an association between a physical entity (e.g., physical NI, channel) or a logical entity (e.g., circuit such as a subscriber circuit or logical circuit (a set of one or more subscriber circuits)) and a context's interface over which network protocols (e.g., routing protocols, bridging protocols) are configured for that context. Subscriber data flows on the physical entity when some higher-layer protocol interface is configured and associated with that physical entity.

Some NDs provide support for implementing VPNs (Virtual Private Networks) (e.g., Layer 2 VPNs and/or Layer 3 VPNs). For example, the ND where a provider's network and a customer's network are coupled are respectively referred to as PEs (Provider Edge) and CEs (Customer Edge). In a Layer 2 VPN, forwarding typically is performed on the CE(s) on either end of the VPN and traffic is sent across the network (e.g., through one or more PEs coupled by other NDs). Layer 2 circuits are configured between the CEs and PEs (e.g., an Ethernet port, an ATM permanent virtual circuit (PVC), a Frame Relay PVC). In a Layer 3 VPN, routing typically is performed by the PEs. By way of example, an edge ND that supports multiple VNEs may be deployed as a PE; and a VNE may be configured with a VPN protocol, and thus that VNE is referred as a VPN VNE.

Some NDs provide support for VPLS (Virtual Private LAN Service). For example, in a VPLS network, end user devices access content/services provided through the VPLS network by coupling to CEs, which are coupled through PEs coupled by other NDs. VPLS networks can be used for implementing triple play network applications (e.g., data applications (e.g., high-speed Internet access), video applications (e.g., television service such as IPTV (Internet Protocol Television), VoD (Video-on-Demand) service), and voice applications (e.g., VoIP (Voice over Internet Protocol) service)), VPN services, etc. VPLS is a type of layer 2 VPN that can be used for multi-point connectivity. VPLS networks also allow end use devices that are coupled with CEs at separate geographical locations to communicate with each other across a Wide Area Network (WAN) as if they were directly attached to each other in a Local Area Network (LAN) (referred to as an emulated LAN).

In VPLS networks, each CE typically attaches, possibly through an access network (wired and/or wireless), to a bridge module of a PE via an attachment circuit (e.g., a virtual link or connection between the CE and the PE). The bridge module of the PE attaches to an emulated LAN through an emulated LAN interface. Each bridge module acts as a "Virtual Switch Instance" (VSI) by maintaining a forwarding table that maps MAC addresses to pseudowires and attachment circuits. PEs forward frames (received from CEs) to destinations (e.g., other CEs, other PEs) based on the MAC destination address field included in those frames.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method for managing storage resources in a network system, the method comprising:
    registering, by a storage resource controller, with a network repository function, wherein the storage resource controller tracks a plurality of resource management instances and a plurality of consumer services;
    receiving, by the storage resource controller, an operation request from a consumer service of the plurality of consumer services;
    selecting, by the storage resource controller, a resource management instance from the plurality of resource management instances managed by the storage resource controller for assignment to the consumer service, wherein the storage resource controller further tracks an association between the resource management instance and the consumer service;
    forwarding, by the storage resource controller, the operation request to the selected resource management instance;
    receiving, by the storage resource controller, an operation response from the selected resource management instance; and
    forwarding, by the storage resource controller, the operation response to the consumer service.

2. The method of claim 1, further comprising:
    registering, by the storage resource controller, a first resource management instance from the plurality of resource management instances such that the first resource management instance is available for assignment to a consumer service; and
    registering, by the storage resource controller, a second resource management instance from the plurality of resource management instances such that the second resource management instance is available for assignment to a consumer service.

3. The method of claim 2, wherein selecting the selected resource management instance comprises:
    determining that the first resource management instance is already assigned to the consumer service such that the first resource management instance is the selected resource management instance and is to be used for handling operation requests from the consumer service.

4. The method of claim 2, wherein selecting the selected resource management instance comprises:
    determining that a third resource management instance is already assigned to the consumer service and the third resource management instance is outside a preferred area associated with the consumer service;
    selecting, in response to determining that the third resource management instance is already assigned to the consumer service and the third resource management instance is outside the preferred area associated with the consumer service, the first resource management instance as the selected resource management instance, wherein the selected first resource management instance is local to a location of the consumer service; and
    establishing data consistency between the third resource management instance and the first resource management instance.

5. The method of claim 2, wherein selecting the selected resource management instance comprises:
    determining that no resource management instance from the plurality of resource management instances is assigned to the consumer service; and
    selecting, in response to determining that no resource management instance from the plurality of resource management instances is assigned to the consumer service, either the first resource management instance or the second resource management instance as the selected resource management instance.

6. The method of claim 5, wherein the resource management controller tracking the association between the resource management instance and the consumer service comprises tracking (1) identifiers of resource management instances from the plurality of resource management instances, (2) identifiers of one or more consumer services from the plurality of consumer service, and (3) associations between the identifiers of resource management instances and the identifiers of the one or more consumer services.

7. The method of claim 6, wherein the identifiers of the resource management instances include a set identifier or deployment unit identifier, and the first resource management instance is associated with the set identifier, the deployment unit identifier, or a group identifier.

8. The method of claim 5, wherein selection of the second resource management instance as the selected resource management instance is based on a set of criteria, including one or more of (1) a load of the first resource management instance, (2) a load of the second resource management instance, and (3) a location or area of the consumer service.

9. The method of claim 1, wherein the consumer service is to provide a discovery message to the network repository function and the network repository function is to provide a discovery response to the consumer service in response to the discovery message, and wherein the discovery response includes an address of the resource management controller such that the consumer service is to transmit the operation request to the resource management controller via the address of the resource management controller.

10. The method of claim 1, wherein the operation response includes an address of the determined resource management instance such that the consumer service is to transmit subsequent operation requests directly to the resource management instance.

11. A non-transitory machine-readable storage medium that provides instructions that, if executed by a processor, will cause said processor to perform operations comprising:

registering, by a storage resource controller, with a network repository function, wherein the storage resource controller tracks a plurality of resource management instances and a plurality of consumer services;

receiving, by the storage resource controller, an operation request from a consumer service of the plurality of consumer services;

selecting, by the storage resource controller, a resource management instance from the plurality of resource management instances managed by the storage resource controller for assignment to the consumer service, wherein the storage resource controller further tracks an association between the resource management instance and the consumer service;

forwarding, by the storage resource controller, the operation request to the selected resource management instance;

receiving, by the storage resource controller, an operation response from the selected resource management instance; and forwarding, by the storage resource controller, the operation response to the consumer service.

12. The non-transitory machine-readable storage medium of claim 11, wherein the operations further comprise:

registering, by the storage resource controller, a first resource management instance from the plurality of resource management instances such that the first resource management instance is available for assignment to a consumer service; and registering, by the storage resource controller, a second resource management instance from the plurality of resource management instances such that the second resource management instance is available for assignment to a consumer service.

13. The non-transitory machine-readable storage medium of claim 12, wherein selecting the selected resource management instance comprises:

determining that the first resource management instance is already assigned to the consumer service such that the first resource management instance is the selected resource management instance and is to be used for handling operation requests from the consumer service.

14. The non-transitory machine-readable storage medium of claim 12, wherein selecting the selected resource management instance comprises:

determining that a third resource management instance is already assigned to the consumer service and the third resource management instance is outside a preferred area associated with the consumer service;

selecting, in response to determining that the third resource management instance is already assigned to the consumer service and the third resource management instance is outside the preferred area associated with the consumer service, the first resource management instance as the selected resource management instance, wherein the selected first resource management instance is local to a location of the consumer service; and establishing data consistency between the third resource management instance and the first resource management instance.

15. The non-transitory machine-readable storage medium of claim 12, wherein selecting the selected resource management instance comprises:

determining that no resource management instance from the plurality of resource management instances is assigned to the consumer service; and selecting, in response to determining that no resource management instance from the plurality of resource management instances is assigned to the consumer service, either the first resource management instance or the second resource management instance as the selected resource management instance.

16. The non-transitory machine-readable storage medium of claim 15, wherein the resource management controller tracking the association between the resource management instance and the consumer service comprises tracking (1) identifiers of resource management instances from the plurality of resource management instances, (2) identifiers of one or more consumer services, from the plurality of consumer services and (3) associations between the identifiers of resource management instances and the identifiers of the one or more consumer services.

17. The non-transitory machine-readable storage medium of claim 16, wherein the identifiers of the resource management instances include a set identifier or deployment unit identifier, and the first resource management instance is associated with the set identifier, the deployment unit identifier, or a group identifier.

18. The non-transitory machine-readable storage medium of claim 17, wherein selection of the second resource management instance as the selected resource management instance is based on a set of criteria, including one or more of (1) a load of the first resource management instance, (2) a load of the second resource management instance, and (3) a location or area of the consumer service.

19. An apparatus for managing storage resources in a network system comprising processing circuitry and a memory, the memory containing instructions executable by the processing circuitry whereby the apparatus is operative to:
- register, by a storage resource controller, with a network repository function, wherein the storage resource controller tracks a plurality of resource management instances and a plurality of consumer services;
- receive, by the storage resource controller, an operation request from a consumer service of the plurality of consumer services;
- select, by the storage resource controller, a resource management instance from the plurality of resource management instances managed by the storage resource controller for assignment to the consumer service, wherein the storage resource controller further tracks an association between the resource management instance and the consumer service;
- forward, by the storage resource controller, the operation request to the selected resource management instance;
- receive, by the storage resource controller, an operation response from the selected resource management instance; and
- forward, by the storage resource controller, the operation response to the consumer service.

20. The apparatus of claim 19, wherein the apparatus is further operative to:
- register, by the storage resource controller, a first resource management instance from the plurality of resource management instances such that the first resource management instance is available for assignment to a consumer service; and
- register, by the storage resource controller, a second resource management instance from the plurality of resource management instances such that the second resource management instance is available for assignment to a consumer service.

* * * * *